(12) United States Patent
Tkachenko

(10) Patent No.: US 8,854,546 B2
(45) Date of Patent: Oct. 7, 2014

(54) METHOD AND APPARATUS FOR DISPLAYING DATA CONTENT

(75) Inventor: Serhiy Tkachenko, Geldrop (NL)

(73) Assignee: Koninklijke Philips N.V., Eindhoven (NL)

( * ) Notice: Subject to any disclaimer, the term of this patent is extended or adjusted under 35 U.S.C. 154(b) by 1329 days.

(21) Appl. No.: 11/917,943

(22) PCT Filed: Jun. 16, 2006

(86) PCT No.: PCT/IB2006/051938
§ 371 (c)(1),
(2), (4) Date: Dec. 18, 2007

(87) PCT Pub. No.: WO2006/136989
PCT Pub. Date: Dec. 28, 2006

(65) Prior Publication Data
US 2010/0214485 A1     Aug. 26, 2010

(30) Foreign Application Priority Data
Jun. 22, 2005  (CN) .......................... 2005 1 0082369

(51) Int. Cl.
*H04N 5/445* (2011.01)
*H04N 21/488* (2011.01)

(52) U.S. Cl.
CPC ....... *H04N 21/4884* (2013.01); *H04N 5/44513* (2013.01)
USPC ...................... 348/563; 348/E7.035; 715/788

(58) Field of Classification Search
CPC .......... H04N 21/4884; H04N 21/4858; H04N 21/4314; H04N 21/4312; H04N 21/4316
USPC .............. 725/37–61; 715/243–253, 788–801; 345/660; 348/553, 563, 564
See application file for complete search history.

(56) References Cited

U.S. PATENT DOCUMENTS

| | | | | |
|---|---|---|---|---|
| 5,477,274 A | * | 12/1995 | Akiyoshi et al. | 348/468 |
| 5,546,131 A | * | 8/1996 | Terry | 348/564 |
| 5,734,436 A | * | 3/1998 | Abe et al. | 348/564 |
| 5,844,620 A | * | 12/1998 | Coleman et al. | 725/54 |
| 6,535,688 B1 | * | 3/2003 | Kawamura et al. | 386/240 |
| 7,751,688 B2 | * | 7/2010 | Seo et al. | 386/241 |
| 2002/0080276 A1 | | 6/2002 | Mori et al. | |
| 2002/0196370 A1 | | 12/2002 | Dagtas et al. | |
| 2003/0025836 A1 | * | 2/2003 | An et al. | 348/584 |
| 2003/0189669 A1 | * | 10/2003 | Bowser | 348/564 |
| 2004/0189868 A1 | | 9/2004 | Molaro et al. | |

(Continued)

FOREIGN PATENT DOCUMENTS

| EP | 0758184 | 2/1997 |
|---|---|---|
| EP | 0766470 | 4/1997 |

(Continued)

OTHER PUBLICATIONS

ISR/Written Opinion of the International Searchng Authority PCT/IB2006051938.

*Primary Examiner* — Hunter B Lonsberry
*Assistant Examiner* — Patrick A Ryan

(57) ABSTRACT

A method of displaying input data content, the input data content comprising video data placed in a video plane and overlay data placed in an overlay plane, said method comprising the steps of: —shifting the video plane compared to the overlay plane so as the overlay plane does not occult the video plane, —mixing the resulting shifted video plane and overlay plane, for generating output data content, and —displaying said output data content.

12 Claims, 5 Drawing Sheets

(56) References Cited

U.S. PATENT DOCUMENTS

| | | |
|---|---|---|
| 2004/0257341 A1 | 12/2004 | Bear et al. |
| 2005/0008347 A1 | 1/2005 | Jung et al. |

FOREIGN PATENT DOCUMENTS

| | | | | |
|---|---|---|---|---|
| EP | 1198128 A2 | 4/2002 | | |
| EP | 1282307 A2 | 2/2003 | | |
| JP | 0946657 A | 2/1997 | | |
| JP | 09046657 | 2/1997 | | |
| JP | 09098389 A | 4/1997 | | |
| JP | 2002-232802 A | * 8/2002 | ............. | H04N 5/445 |
| JP | 2003333453 A1 | 11/2003 | | |
| JP | 2004208014 A | * 7/2004 | ............. | H04N 7/025 |
| WO | 2006136989 A1 | 12/2006 | | |

* cited by examiner

METHOD AND APPARATUS FOR DISPLAYING DATA CONTENT

FIELD OF THE INVENTION

The invention relates to a method and apparatus for displaying a data content of an optical disk or TV broadcast.

BACKGROUND OF THE INVENTION

When displaying television programs, or data from optical disk, such as CD (Compact Disk), DVD (Digital Versatile Disk), BD (Blu-Ray Disk), or any other data media carriers, a video may have various elements overlaid over it (referred to as "overlay data" in the following). A typical example is subtitles usually placed at the bottom or top of video area. Other overlay may also include scoreboards, news tickers, or logos.

FIG. 1 illustrates a conventional display where video data placed in a video plane and overlay data placed in an overlay plane are displayed. Here, the overlay data (e.g. subtitles) is located at the bottom of the video. As a consequence, part of video area is occulted by the overlay data.

To solve this problem, some techniques are known for detecting semantic features and adaptively adjusting the placement of the overlay data in the display area.

A method of adaptive the placement of overlay data in video is disclosed in US 2002/0196370 A1. This document describes a method of placing overlay elements in images of a digital video so that desirable viewing areas of the images are not occluded by the overlay element. This method includes extracting frames from the video, each of the frames defining an image which may have one or more desirable viewing areas. For each frame an area is selected in the image for placing an overlay element and the percentage the overlay element overlaps the desirable viewing areas is determined for the selected area. The overlay element is placed in the selected area if the percentage is below a maximum allowed predetermined percentage of overlapping. If it is not, one or more other areas in the image are selected and/or the size, shape, aspect ratio of the overlay element is changed until a position and/or size, shape, aspect ratio is found which minimizes occlusion of the desirable viewing areas in the image.

This known method has however some limitations.

First, this method determines in real-time a percentage of the overlay data which overlap each desirable viewing area in each video frame so as to find the most suitable area to place the overlay data. This method is thus complex and requires a lot of expensive data processing means.

Secondly, even if overlay data are placed in the best desirable area of video, they still overlap the video, to the detriment of overall visual comfort for the viewer.

OBJECT AND SUMMARY OF THE INVENTION

It is an object of the invention to provide an improved method and apparatus for displaying data content comprising video data placed in a video plane and overlay data placed in an overlay plane.

The method according to the invention comprises the steps of:
shifting the video plane compared to the overlay plane so as the overlay plane does not occult the video plane,
mixing the resulting shifted video plane and overlay plane, for generating output data content, and
displaying said output data content.

The apparatus according to the invention comprises:
shifting means for shifting the video plane compared to the overlay plane so as the overlay plane does not occult the video plane,
mixing means for mixing the resulting shifted video plane and overlay plane, for generating output data content, and
a display for displaying said output data content.

The advantage of the proposed method and apparatus is that the overlay data and the video data can be shifted in a very easy way compared to each other, without any complex and expensive data processing means.

Also, the proposed method and apparatus allow that the overlay data no more occult the video plane. In other words, overlay data no more overlaps the video data, resulting in a better rendering for a user.

BRIEF DESCRIPTION OF THE DRAWINGS

These and other aspects of the method and apparatus of displaying data content, according to the invention will become apparent from and will be elucidated with respect to the implementations and embodiments described hereinafter and with reference to the accompanying drawings, wherein.

Same reference numerals are used to denote similar parts throughout the figures.

DETAILED DESCRIPTION OF THE INVENTION

Figure 1:
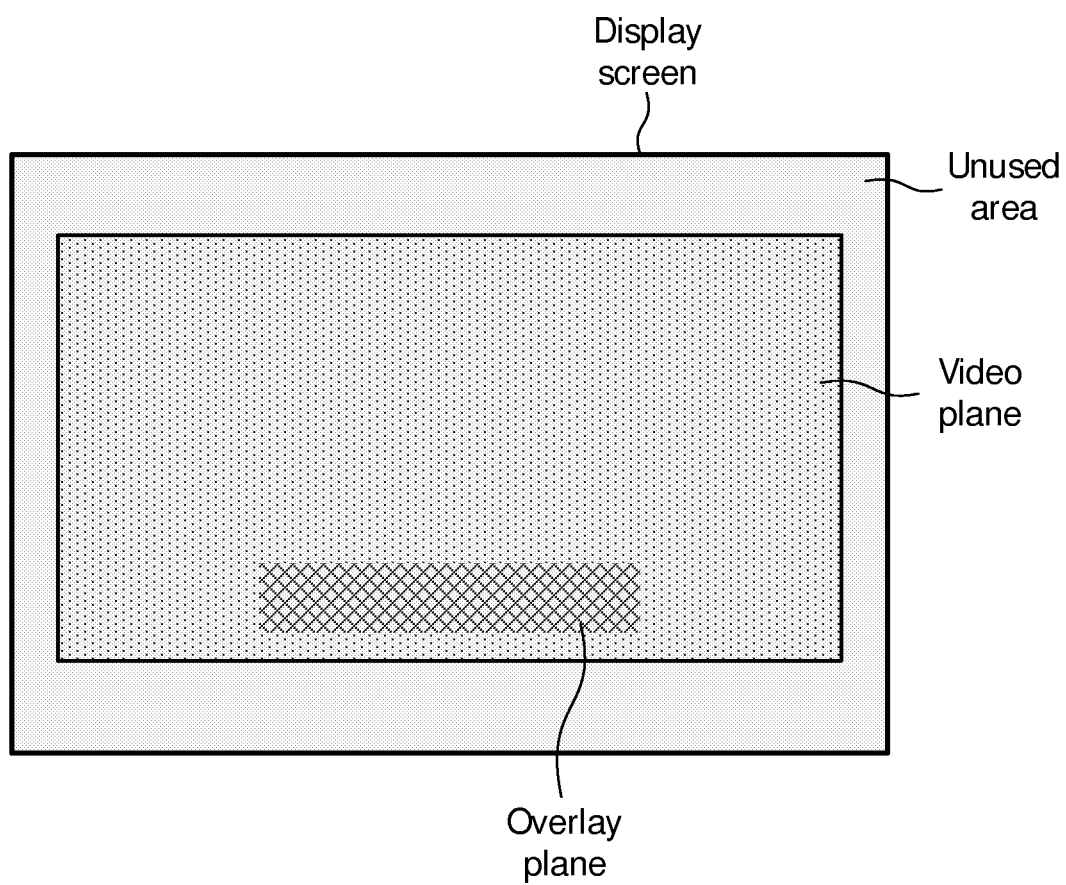
FIG. 1 illustrates by an example a conventional display of overlay data placed in an overlay plane and video data placed in a video plane.
Figure 2:
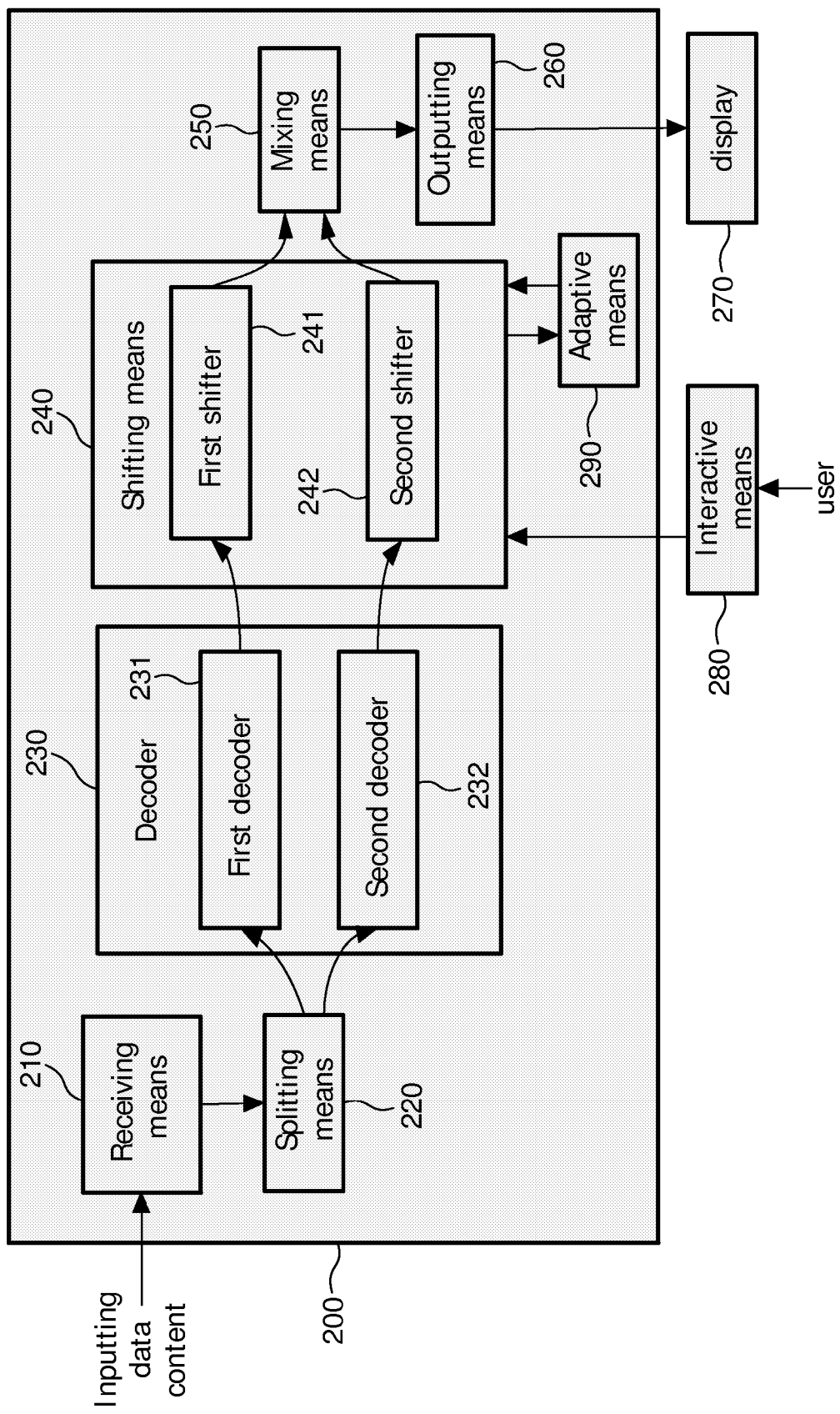
FIG. 2 is a schematic block diagram illustrating an apparatus to display data content according to the invention.

FIG. 2 is a schematic block diagram illustrating an apparatus 200 to display data content according to the invention. The apparatus 200 may correspond to a TV, an optical disk player etc.

The apparatus 200 comprises receiving means 210, splitting means 220, a decoder 230, shifting means 240, mixing means 250, outputting means 260, a display 270, interactive means 280, and adaptive means 290. All these elements of the apparatus 200 may be supported by at least one CPU with software or firmware.

Receiving means 210 are used to receive input data content. The input data content comprises video data placed in a video plane and overlay data placed in an overlay plane. Receiving means 210 may correspond to be a buffer or a memory. The input data content can be coded or not be coded. For example, the video data may be coded according to the MPEG-2 standard, and the overlay data (e.g. subtitles) may be coded according to text encoding algorithm.

Splitting means 220 are used to split the input data content to video data placed in the video plane and overlay data placed in the overlay plane. The video data and the overlay data are thus separate streams. For example, if the input data content is a multiplexed stream (for example multiplexed into an MPEG or JPEG system stream), splitting means 220 corresponds to a de-multiplexer unit.

If de-multiplexed video data and overlay data are directly available, then splitting means 220 can be omitted in the apparatus 200.

If the input data content is coded, the decoder 230 is used to decode the input data content. The decoder 230 may comprise a first decoder 231 used to decode the video data, and a second decoder 232 used to decode the overlay data. For example, if the input data content is coded according to an MPEG standard, the decoder 230 is an MPEG decoder.

Shifting means 240 are used to shift the video plane compared to the video plane so as the overlay plane does not occult the video plane.

Shifting means 240 may comprise a first shifter 241 used to shift the video plane compared to the overlay plane, and a second shifter 242 used to shift the overlay plane compared to the video plane.

Shifting means 240 are intended to independently shift the video plane and/or the overlay plane along a vertical or horizontal direction. The shifting means 240 can thus shift the overlay plane to an area out of the video plane, or alternatively shift the video plane to an area out of the overlay plane.

Figure 4:
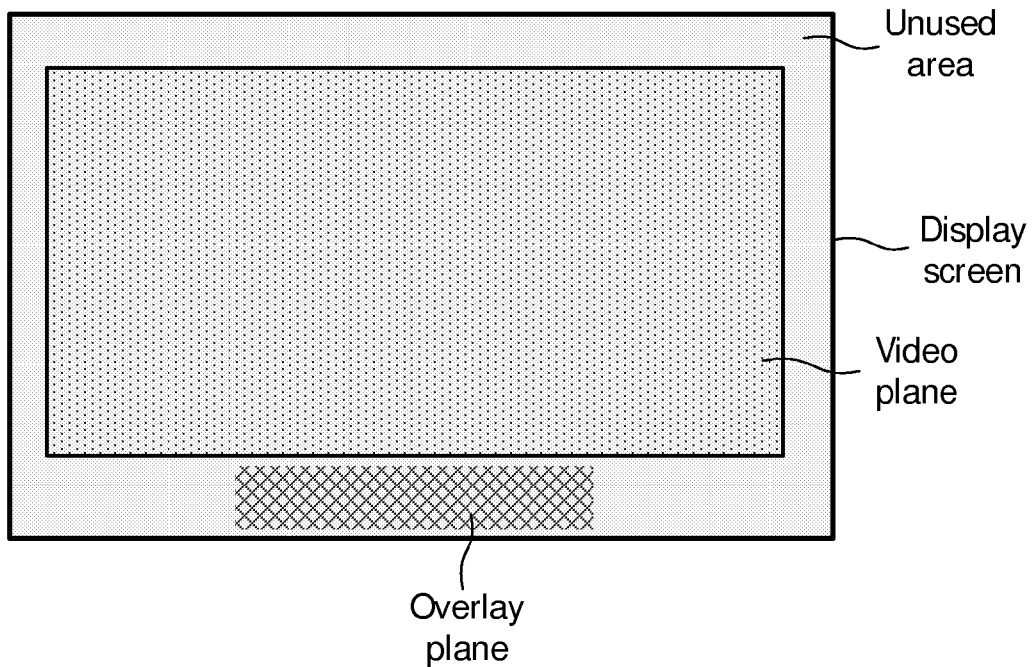
FIG. 4 illustrates by a first example the display of overlay data placed in an overlay plane and video data placed in a video plane according to the invention.

For example, in FIG. 4, the overlay plane has been shifted along the vertical direction out of the video plane, and is located below the video plane in an unused area at the bottom of a display screen, so as the overlay plane does not occult the video plane.

Figure 5:
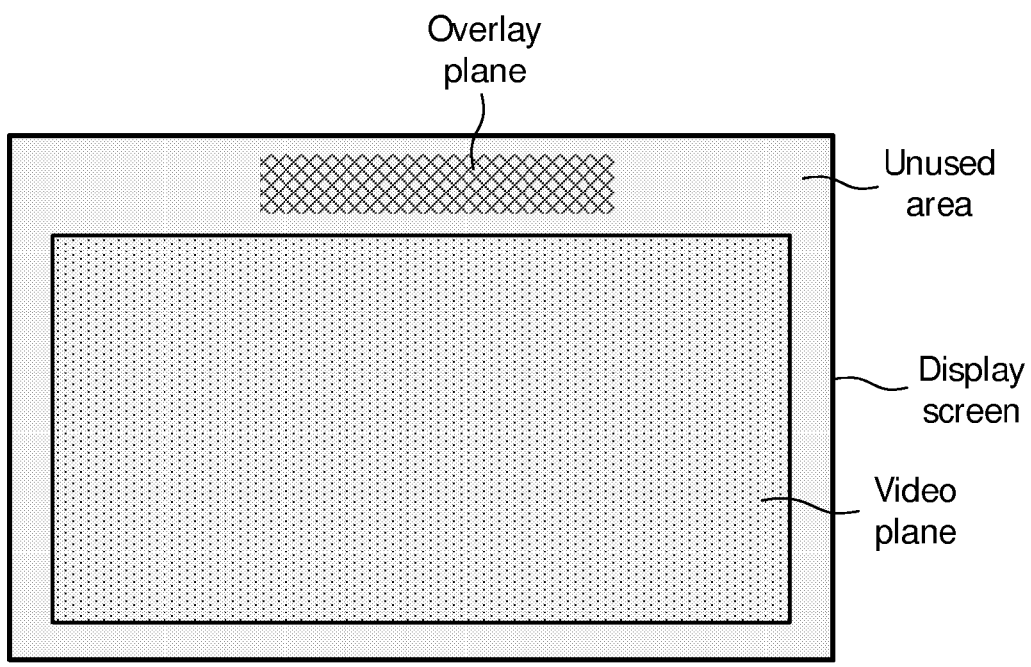
FIG. 5 illustrates by a second example the display of overlay data placed in an overlay plane and video data placed in a video plane according to the invention.

For example, in FIG. 5, the overlay plane and the video plane have both been shifted along opposite vertical directions, so as the overlay plane is out of the video plane and located in an unused area at the top of the display screen without occulting the video plane.

Figure 6:
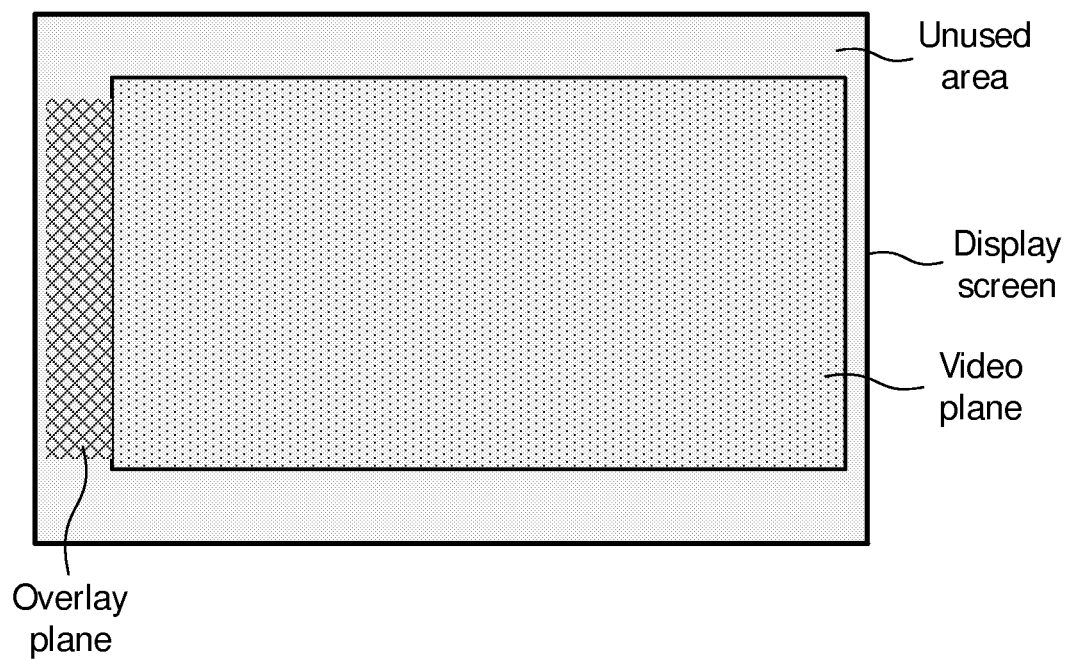
FIG. 6 illustrates by a third example the display of overlay data placed in an overlay plane and video data placed in a video plane according to the invention.

For example, in FIG. 6, the overlay plane has been shifted along the horizontal direction out of the video plane and is located in an unused area at the left of the display screen without occulting the video plane.

Mixing means 250 are used to mix the resulting shifted video plane and overlay plane, for generating output data content, and to send the corresponding data stream to outputting means 260.

Outputting means 260 are used to output the output data content from the mixing means 250. For example, outputting means may correspond to a buffer or to an output driver.

The output data content is intended to be displayed on a display 270, either being part of the apparatus 200 (e.g. LCD display if the apparatus is a computer or portable device), or separate from the apparatus 200 (e.g. TV display).

Interactive means 280 are used to control the shifting means 240 to shift along horizontal or vertical direction the overlay plane and/or the video plane according to a user's indication. Interactive means 280 allow a user to interact with the apparatus 200, and to manually shift the overlay plane compared to the video plane.

Interactive means 280 may be separate from the apparatus 200 (e.g. a remote control, a mouse, a keyboard), or alternatively part of the apparatus 200 (e.g. buttons placed on the front of the apparatus), from which the user presses numeral buttons, left/right buttons, up/down buttons, moves a mouse ball of a mouse to input shifting direction. In response, interactive means 280 send the corresponding shift value to shifting means 240.

Advantageously, the apparatus 200 comprises adaptive means 290 used to automatically determine the shift of said video plane and/or said overlay plane. To this end, by calculating the position of the video plane and the overlay plane in the display screen, adaptive means 290 can calculate the shift value so as the overlay plane does not occult the video plane.

Figure 3:
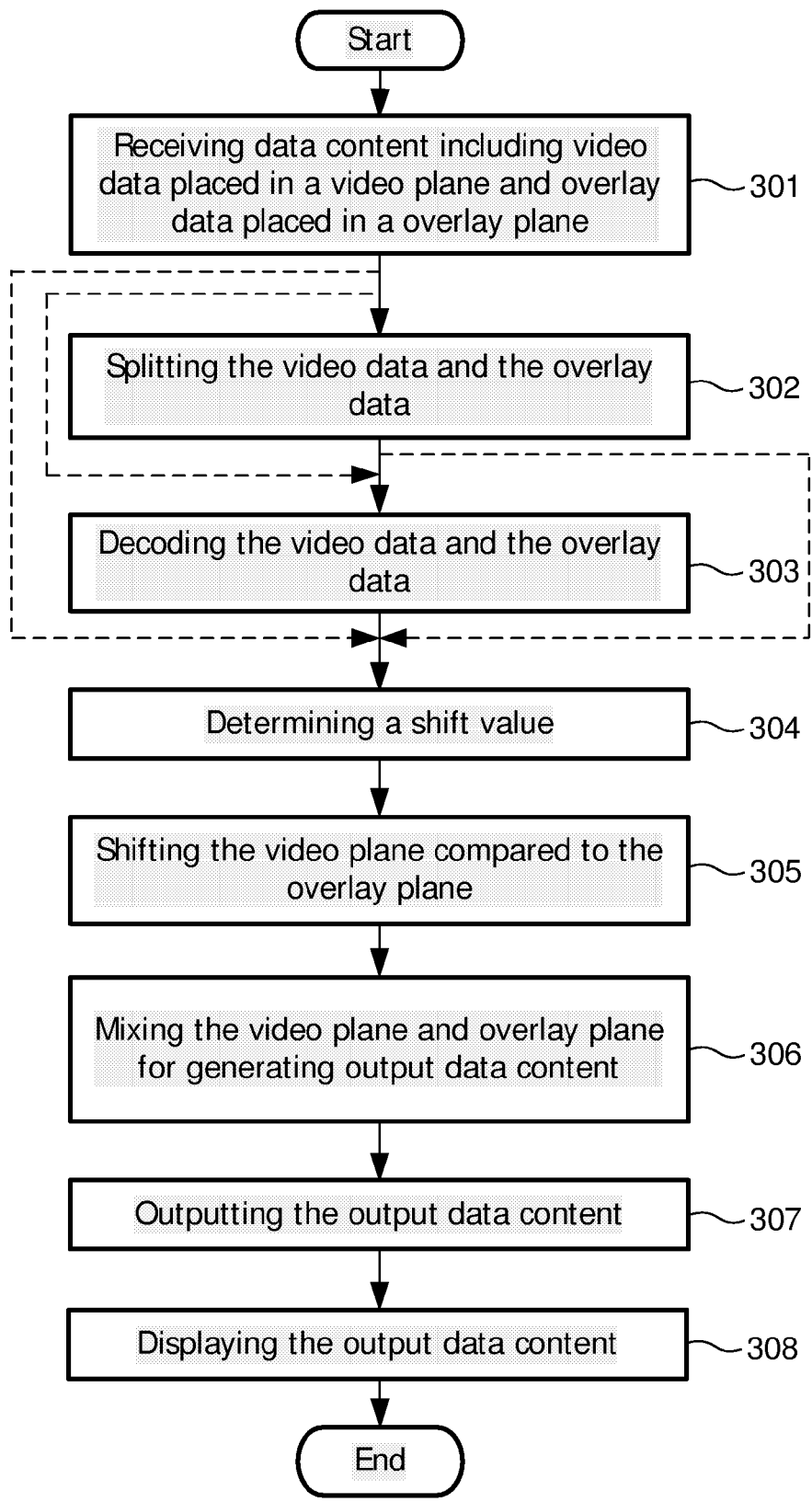
FIG. 3 is a flow chart diagram of a method to display data content according to the invention.

FIG. 3 is a flow chart diagram of a method to display data content according to the invention. The method according to the invention comprises the steps of:

- receiving (301) data content comprising video data placed in a video plane and overlay data placed in an overlay plane. The data content may come from an optical disk, TV broadcast etc.
- splitting (302) the video data and the overlay data. The video data and the overlay data are separate streams that are multiplexed into an MPEG or JPEG system stream. The video data and the overlay data may be split by a method of de-multiplexing. If de-multiplexed video data and overlay data are directly available, the step of splitting (302) can be omitted (cf. corresponding dashed lines).
- decoding (303) the video data and the overlay data. If the video data and the overlay data are not coded, the decoding step can be ignored (cf. corresponding dashed lines).
- determining (304) a shift value. The shift value is either manually done by a user (via a remote control, mouse, keyboard etc.), or alternatively automatically in calculating the position of the video plane and the overlay plane in a display screen, then calculating the shift value so as the overlay plane does not occult the video plane.
- shifting (305) the overlay plane compared to the overlay plane so as the overlay plane does not occult the video plane. The shifting step is intended to independently shift the video plane and/or the overlay plane along a vertical or horizontal direction. The shifting step can thus shift the overlay plane to an area out of the video plane, or alternatively shift the video plane to an area out of the overlay plane, as shown in FIG. 4, 5, or 6.
- mixing (306) the video plane and the overlay plane which have been shifted for generating output data content.
- outputting (307) the output data content. The outputting stream of the data content can be outputted to a display screen, such as TV display, computer display etc.
- displaying (308) the output data content on the display screen.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the means claims enumerating several means, several of these means can be embodied by one and the same item of hardware. The usage of the words first, second and third, etcetera do not indicate any ordering. These words are to be interpreted as names.

The invention claimed is:

1. A method of displaying input data content that includes video data placed in a video plane and overlay data placed in an overlay plane, said method:
   splitting a single input stream into a video stream defining the video plane and a separate overlay stream defining the overlay plane,
   calculating the position of the video plane and the overlay plane in a display screen,
   calculating at least a first shift value for shifting the overlay plane with respect to the video plane, calculating at least a second shift value for shifting the video plane with respect to the overlay plane, shifting the overlay plane with respect to the video plane in accordance with the at least first shift value while maintaining the original dimensions of the overlay plane, shifting the video plane with respect to the overlay plane in accordance with the at least second shift value while maintaining the original dimensions of the video plane, mixing the shifted video plane and overlay plane for generating an output data content, displaying said output data content, and wherein a user interacts with interactive means to manually input shift instructions from which said interactive means generates a corresponding shift value to shift the video plane with respect to the overlay plane.

2. The method as claimed in claim 1, wherein the shifting is to shift at least one of said video plane and said overlay plane along at least one of a vertical direction and horizontal direction.

3. The method as claimed in claim 1, wherein the shifting is to shift said overlay plane to an area out of the video plane.

4. The method as claimed in claim 1, wherein the shifting is to shift said video plane to an area out of the overlay plane.

5. The method as claimed in claim 1, further comprising determining a shift value to indicate a shift to be applied to at least one of said video plane and said overlay plane.

6. An apparatus for displaying input data content that includes video data placed in a video plane and overlay data placed in an overlay plane, said apparatus comprising:

splitting means for splitting a single input stream into a video stream defining the video plane and a separate overlay stream defining the overlay plane, calculating means for calculating the position of the video plane and the overlay plane in a display screen and for calculating at least one shift value such that the overlay plane does not occult the video plane, first shifting means for shifting the video plane with respect to the overlay plane while maintaining the original dimensions of the video plane, second shifting means for shifting the overlay plane with respect to the video plane while maintaining the original dimensions of the overlay plane, mixing means for mixing the shifted video plane and overlay plane to generate an output data content, interactive means for receiving manual shift instructions from a user and generating a corresponding shift value to shift the video plane with respect to the overlay plane, a display for displaying said output data content.

7. The apparatus as claimed in claim 6, further comprising interactive means for controlling a shift of at least one of said video plane and said overlay plane along at least one of a vertical direction and horizontal direction.

8. The apparatus as claimed in claim 6, further comprising adaptive means for determining a shift value of at least one of said video plane and said overlay plane.

9. The apparatus as claimed in claim 7, wherein said interactive means is at least one of a remote control, a mouse, and a keyboard.

10. The apparatus as claimed in claim 6, wherein said shifting means includes a first shifter for shifting the video plane to an area out of the overlay plane, and a second shifter for shifting the overlay plane to an area out of the video plane.

11. The method of claim 1 wherein the separate video stream is decoded and the separate overlay stream is decoded independent of the video stream.

12. The apparatus of claim 6, comprising:

a first decoder for decoding the separate video stream, a second different decoder for decoding the separate overlay stream.

* * * * *